United States Patent [19]

Schneider et al.

[11] 4,172,440
[45] Oct. 30, 1979

[54] CUTTING MONOFILAMENT

[75] Inventors: Fritz Schneider, Bobingen; Lothar Bayersdorfer, Augsburg, both of Fed. Rep. of Germany

[73] Assignee: Hoechst Aktiengesellschaft, Frankfurt am Main, Fed. Rep. of Germany

[21] Appl. No.: 908,859

[22] Filed: May 23, 1978

Related U.S. Application Data

[63] Continuation of Ser. No. 780,125, Feb. 22, 1977, abandoned.

[30] Foreign Application Priority Data

Mar. 27, 1976 [DE] Fed. Rep. of Germany ....... 2613141

[51] Int. Cl.² ............................................. B28D 1/06
[52] U.S. Cl. ........................................ 125/18; 51/295; 51/298; 125/21

[58] Field of Search ................. 51/400, 295, 298; 125/18, 21

[56] References Cited

U.S. PATENT DOCUMENTS

| | | | |
|---|---|---|---|
| 2,810,426 | 10/1957 | Till | 51/295 X |
| 3,150,470 | 9/1964 | Barron | 51/400 |
| 3,400,494 | 9/1968 | Seitz | 125/21 X |
| 3,522,342 | 7/1970 | Nungesser | 51/295 X |
| 3,969,090 | 7/1976 | Sasena | 51/400 |
| 4,035,961 | 7/1977 | Pemrick | 51/298 A |

*Primary Examiner*—Harold D. Whitehead
*Attorney, Agent, or Firm*—Connolly and Hutz

[57] ABSTRACT

Cutting filaments having a long service life consist of a monofilament of a synthetic polymer into which from 0.3 to 10 percent by weight of an abrasive are incorporated. In the cutting process the abrasive is not ripped off, as it does happen with steel wires bearing the abrasive on their surface, but it is pressed into the monofilament and can be easily recovered therefrom.

7 Claims, 2 Drawing Figures

PRIOR ART FIG. 2

CUTTING MONOFILAMENT

This application is a continuation of Ser. No. 780,125, filed Feb. 22, 1977 and now abandoned.

This invention relates to a cutting monofilament consisting of a synthetic high molecular weight polymer and an abrasive.

One of the oldest forms of saws is the string saw in which the string is made from staple fiber yarn and with which cutting is performed by applying to said string a suspension of sand and water during the sawing process. Saws of this type in mechanized form are widely used in rock and marble quarries. Instead of yarns of natural fibers, such a flax or cotton, there are mostly used steel wire cables having a diameter of a few millimeters. With wire cables of this type the suspension of the abrasive sand migrates, of course, into all machine parts of the saw thus causing considerable damage and frequent breakdowns.

Attempts have, therefore, been made to use to an increasing extent sawing wires in which the abrasive is directly encapsulated on the surface. In German Pat. No. 916,143, for example, steel wires have been proposed onto which diamond particles have been fastened by electrogalvanization, while laid open German Pat. No. 2,142,002 describes monofilaments and multifilaments as carrier for the abrasive.

String saws are used not only in quarries but also in the industry of semi-conductors and in optics, mainly for brittle materials, for example as decribed in laid open German Pat. No. 2,359,859. In this case, too, steel wires with a charge of abrasive material, for example diamond, are preferably used (cf. the leaflet of Messrs. Laser Technology Inc., 1972).

The manufacture of such diamond charged steel wires is rather expensive and during sawing the precious diamond particles detach from the wire and get lost.

The disadvantages of metal wires are eliminated according to the invention by a cutting monofilament consisting of a synthetic high molecular weight polymer charged with 0.3 to 10% by weight of incorporated abrasive.

Suitable synthetic high molecular weight polymers are preferably linear polyesters, especially polyethylene terephthalate without or with minor addition of modification agents and having a specific viscosity over 0.7 in the monofilament, the specific viscosity being measured in 1% by weight solution of the polyester in a phenol-tetrachloroethane mixture in a proportion by weight of 3:2 at 25° C.

As abrasive particles boron carbide and other carbides are preferred, although diamond can also be used for special applications.

The preferred concentration of boron carbide in the monofilament is in the range of from 3 to 7% by weight, calculated on the polymer, the particles preferably having a size corresponding to 0.1 to 0.4 times the diameter of the monofilament. The monofilaments preferably have a diameter of from 0.1 to 3 mm.

It has surprisingly been found that the cutting effect of saws filled with abrasive particles does not increase with the concentration of the particles on the surface, but that an optimum cutting effect for different materials has to be determined by preliminary tests. It is quite obvious that the mechanical properties of the monofilament diminish with an increasing concentration of the abrasive in the polymer material.

In most cases, the abrasive particles will be as large as possible. Their size should be adapted, however, to the type of material to be cut and the diameter of the monofilament used.

Monofilaments having a larger diameter have, of course, a higher mechanical strength, but they require a higher sawing power because of the larger sawway. In the case of very valuable material to be sawn, the loss of material may recommend the use of very thin monofilaments.

The invention will now be described by way of example with reference to the accompanying drawing in which FIGS. 1 and 2 represent cross sections of sawing wires of comparable cutting effect, i.e. with a like content of abrasive on the surface.

FIG. 2 represents a commercial steel wire with abrasive particles 3 on the surface.

Figure 1:
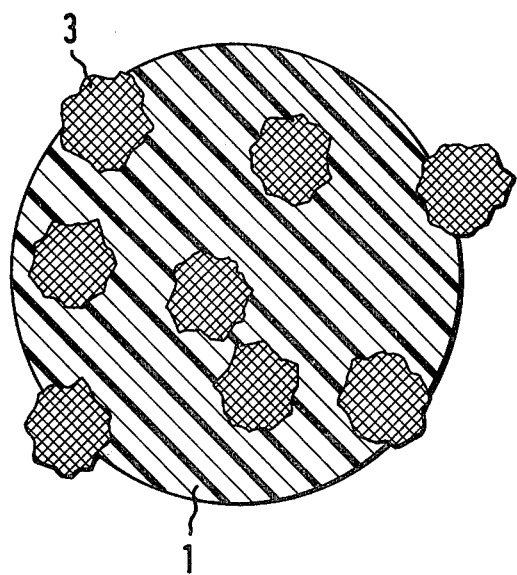
FIG. 1 represents a monofilament according to the invention consisting of the polymer 1 and the abrasive 3.
Figure 1:
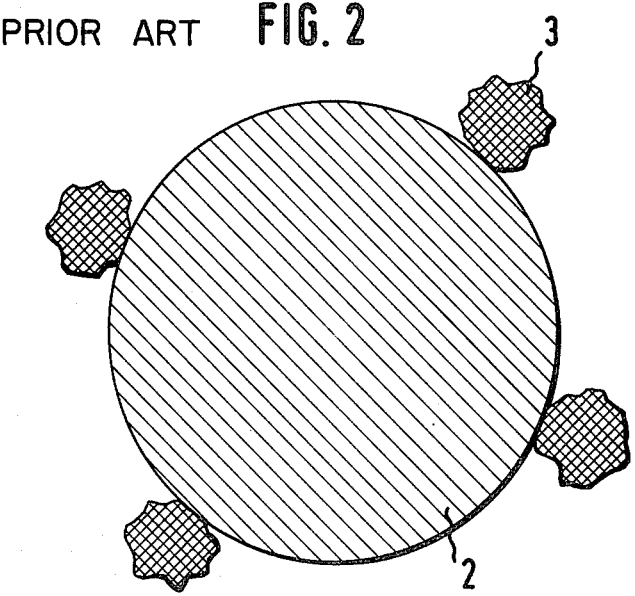

A great advantage of the cutting monofilament according to the invention is the simplicity of its manufacture. The abrasive can be added during polycondensation or during spinning, for example as described in U.S. Pat. No. 3,522,342 relating to the production of abrasive bristles for abrasive disks.

It has surprisingly been found that the cutting capacity of a monofilament according to the invention consisting of polyethylene terephthalate with an addition of 6% by weight of boron carbide is superior to that of a commercial steel wire charged with diamond. It is still more surprising that the cutting monofilament of the invention has a very long service life (cf. the examples).

In contradistinction to a steel wire, the cutting effect of the monofilament is not lost by a detachment of the abrasive particles, but by the fact that the particles are pressed into the monofilament. In this manner, a major proportion of the abrasive can be recovered and used again. This advantage is especially important with very valuable abrasives, for example diamond.

The cutting filaments according to the invention have very good mechanical properties. Neither an elongation nor a splitting of the monofilament during cutting has been observed. As compared to pure polyethylene terephtalate monofilament, the longitidinal strength was reduced by 30% with a boron carbide addition of 3% by weight and by about 50% with a 6% addition, which is still sufficient for the use as cutting wire, so that no sawing experiment had to be interrupted because of mechanical damage.

In some fields of application the surprisingly low coefficient of friction of the cutting filament of the invention is rather interesting as only little heat is generated during cutting. As compared to steel, a cutting filament of the invention consisting of polyethylene terephthalate with 6% by weight of boron carbide having a particle size of about 60 microns and a diameter of the monofilament of about 0.35 had a coefficient of friction of 0.39 only (for the definition cf. Lange, Melliand Textilberichte 56 (1975), pages 348 to 352, 530 to 535 and 610 to 612).

Hence, the cutting monofilament according to the invention has at least the same cutting effect and service life as a steel wire charged with abrasive, but, owing to its simple manufacturing method, it can be adapted more easily to the special cutting problem. The abrasive can be recovered from the cutting monofilament and used again, whereas the abrasive charge of known steel wires is lost during the sawing process.

The following examples illustrate the invention.

EXAMPLE 1

The properties of two cutting monofilaments according to the invention were compared with those of a comparable commercial steel wire charged with diamond. In each case the wire had a diameter of from 0.5 to 0.35 mm, the sawing speed was 0.9 m/sec with a wire tension of about 350 g. For cutting potassium hydrogen phosphate monocrystals having a Mohs' hardness of about 3 was used.

The cutting monofilaments of the invention consisted of polyethylene terephthalate having a specific viscosity of 0.75 with a 3% by weight addition of boron carbide and of 0.70 with a 6% by weight addition of boron carbide. The average particle size of the carbide was 62 microns.

|  | monofilament of invention with an addition of | | diamond charged commercial steel wire |
| --- | --- | --- | --- |
|  | 3% $B_4C$ | 6% $B_4C$ |  |
| cutting capacity | 7 cm$^2$/hr | 10 cm$^2$/hr | 7 cm$^2$/hr |
| sevice life | up to 15 hrs | up to 15 hrs | up to 10 hrs |
| consumption of abrasive | about 10% | about 10% | 100% |

EXAMPLE 2

The cutting effect of a monofilament of the invention was compared with that of normal textile yarns containing 1.2% of $TiO_2$. Under the same cutting conditions and with the same cutting speed, the lengths of monofilament and of yarn were compared which were required to cut a standardized sample.

|  | copper | steel |
| --- | --- | --- |
| titanium dioxide yarn (1.2%) | 900 m | 1,000,000 m |
| boron carbide monofilament (6%) | 3.3 m | 200 m. |

What is claimed is:

1. An elongated cutting filament for sawing hard materials consisting of a monofilament of a synthetic high molecular weight linear polyester and 0.3 to 10% by weight of incorporated abrasive, and the linear polyester having a specific viscosity above 0.7.

2. Cutting filament as claimed in claim 1, wherein the monofilament is made of pure or slightly modified polyethylene terephthalate.

3. Cutting filament as claimed in claim 1, wherein the abrasive is a carbide.

4. Cutting filament as claimed in claim 3, wherein the abrasive is boron carbide.

5. Cutting filament as claimed in claim 1, wherein the abrasive particles have a diameter corresponding to less than one half of the diameter of the monofilament.

6. Cutting filament as claimed in claim 5, wherein the diameter of the abrasive particles is from 0.1 to 0.4 times the diameter of the monofilament.

7. Cutting filament as claimed in claim 1, having a diameter of from 0.1 to 3 mm.

* * * * *